(12) United States Patent
Suh et al.

(10) Patent No.: US 8,153,287 B2
(45) Date of Patent: Apr. 10, 2012

(54) AIR SUPPLY SYSTEM FOR FUEL CELL AND FUEL CELL SYSTEM USING THE SAME

(75) Inventors: Jun Won Suh, Yongin (KR); Jong Ki Lee, Seoul (KR); Won Hyouk Jang, Yongin (KR); Ri A Ju, Yongin (KR); Dong Yun Lee, Yongin (KR); Eun Suk Cho, Yongin (KR); Jin Hong An, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1277 days.

(21) Appl. No.: 11/440,722

(22) Filed: May 24, 2006

(65) Prior Publication Data

US 2006/0292425 A1   Dec. 28, 2006

(30) Foreign Application Priority Data

Jun. 24, 2005 (KR) .................. 10-2005-0055304

(51) Int. Cl.
  *H01M 8/02* (2006.01)
  *H01M 8/04* (2006.01)

(52) U.S. Cl. .......... 429/34; 429/408; 429/427; 429/443; 429/444; 429/455; 429/456; 429/508; 429/512; 429/513

(58) Field of Classification Search .................. None
  See application file for complete search history.

(56) References Cited

U.S. PATENT DOCUMENTS

| 4,325,149 | A | * | 4/1982 | Moreland | 4/541.5 |
|---|---|---|---|---|---|
| 4,521,493 | A | * | 6/1985 | Class | 428/498 |
| 4,706,326 | A | * | 11/1987 | Romani | 15/314 |
| 5,049,770 | A | * | 9/1991 | Gaeth et al. | 310/89 |
| 6,375,721 | B1 | * | 4/2002 | Holter | 96/66 |
| 6,461,125 | B1 | * | 10/2002 | Terasawa et al. | 417/479 |
| 6,911,189 | B1 | * | 6/2005 | Koller et al. | 423/245.1 |
| 2003/0015184 | A1 | * | 1/2003 | Klipfel et al. | 123/568.12 |
| 2004/0001003 | A1 | * | 1/2004 | Scofled | 340/607 |
| 2005/0051383 | A1 | * | 3/2005 | Harwood | 181/256 |

FOREIGN PATENT DOCUMENTS

KR  10-2005-0025489  3/2005

* cited by examiner

*Primary Examiner* — Ula C. Ruddock
*Assistant Examiner* — Alix Echelmeyer
(74) *Attorney, Agent, or Firm* — Christie, Parker & Hale, LLP (57) ABSTRACT

An air supply system for a fuel cell and a fuel supply system with the same include a housing having an inlet hole and an outlet hole for respectively allowing inward and outward flow of a fluid; an air pump inserted and installed into the housing and having an inlet tube into which the fluid flows and an outlet tube through which the fluid flows out; a filtering portion installed between the inlet hole and the outlet hole within the housing and filtering particulate contaminants and chemical contaminants in the fluid; and a soundproofing member installed between the outlet tube and the outlet hole within the housing.

19 Claims, 4 Drawing Sheets

AIR SUPPLY SYSTEM FOR FUEL CELL AND FUEL CELL SYSTEM USING THE SAME

CROSS-REFERENCE TO RELATED APPLICATIONS

This application claims priority to and the benefit of Korean Patent Application No. 10-2005-0055304, filed on Jun. 24, 2005, in the Korean Intellectual Property Office, the entire content of which is incorporated herein by reference.

BACKGROUND

A polymer electrolyte membrane fuel cell (PEMFC) system typically includes a stack, a reformer, a fuel tank, and a fuel pump. The polymer electrolyte membrane fuel cell system supplies fuel in the fuel tank to the reformer by operating the fuel pump, generates hydrogen gas by reforming the fuel in the reformer, and generates electric energy by electrochemically reacting hydrogen with oxygen.

A direct methanol fuel cell (DMFC) is capable of directly supplying a liquid methanol fuel to the stack. A direct methanol fuel cell system is more advantageous in view of miniaturization because it does not use the reformer, unlike the polymer electrolyte membrane fuel cell system discussed above.

The stack of a fuel cell has a structure that several to several tens of unit cells, which are typically composed of a membrane electrode assembly (MEA) and a separator, are stacked. The membrane electrode assembly has a structure to which an anode electrode (namely, "fuel electrode" or "oxidation electrode") and a cathode electrode (namely, "air electrode" or "reduction electrode") are attached, with the polymer electrolyte membrane therebetween. The stack of the fuel cell is compressed and sealed to prevent non-uniform operating conditions such as pressure drop or oxygen decrease inside the stack.

An air pump can be mounted on the PEMFC or DMFC fuel cell system in order to supply an amount of oxygen necessary for obtaining a desired energy output to the fuel cell.

However, in the transportable fuel cell system used as a mobile power source or a transportable power source, a serious operational problem of the fuel cell may occur due to various contaminants in the air being taken into the fuel cell, according to changes in the location its use. The fuel cell is operated depending on the elaborately equilibration-controlled chemical reaction, which may be adversely affected by the contaminants in the air. Possible contaminants in the air include, for example, small particles floating in air such as dust, smog and smoke particles, etc.; hydrocarbon-based substances such as aromatic hydrocarbon, methanol, butane and propane; and volatile organic compounds such as ammonia, ozone, hydrogen sulfide, sulfur oxide, nitrogen compound and carbon monoxide, etc. Therefore, in most transportable fuel cell systems, a filtering system suitable for removing various contaminants in air has been required.

In the transportable fuel cell system, it is generally necessary to reduce the weight and the volume of the air supply system so that transportation and portability of the fuel cell system, on which the air supply system including the air pump and the filtering system is mounted, can be easy. Therefore, in the conventional transportable fuel cell system, there is a need of an air supply system suitable for miniaturization.

The air pump to be mounted on the transportable fuel cell system supplies air to the fuel cell through an air movement device such as a fan or a compressor positioned in an airflow stream. However, the air pump unfortunately generates a considerable level of noise. Herein, "noise" means unpleasant sound waves generated from moving parts, such as a rotor, an impeller, a vane, or a piston of the air pump. Therefore, in order to use the fuel cell system as a power source of a portable communication terminal, etc., such as a low noise notebook computer, it is necessary to reduce the noise of the air pump in the fuel cell system below proper levels.

SUMMARY OF THE INVENTION

Accordingly, it is an aspect of some embodiments of the present invention to provide a miniaturized air supply system for a fuel cell having an air filtering function and a noise suppressing function, and configured of a single housing structure on which an air pump is mounted.

It is another aspect of the present invention of some embodiments to provide a fuel cell system using the above air supply system.

One embodiment includes an air supply system for a fuel cell, with a housing having an inlet hole and an outlet hole for respectively allowing inward and outward flow of a fluid; an air pump inserted and installed into the housing and having an inlet tube into which the fluid flows and an outlet tube through which the fluid flows out; a filtering portion installed between the inlet hole and the outlet hole within the housing and filtering particulate contaminants and chemical contaminants in the fluid; and a soundproofing member installed between the outlet tube and the outlet hole within the housing.

In one embodiment, the filtering portion includes at least one particulate removing filter and at least one absorbing filter, which are compressed and molded in a plate shape. The particulate removing filter may be composed of cellulose, a synthesis member having a nanofiber layer, or a combination thereof.

The absorbing filter may have a basic surface for removing acid contaminants, the acid contaminants including at least one of sulfur oxide, nitrogen oxide, hydrogen sulfide, hydrogen chloride, volatile organic acids, and nonvolatile organic acids. The absorbing filter may have an acid surface for removing basic contaminants, the basic contaminants including at least one of ammonia, amine, amide, sodium hydroxide, lithium hydroxide, potassium hydroxide, volatile organic base, and non-volatile organic base. The absorbing filter may also be composed of at least one of active carbon fiber, ion exchange fiber, ion exchange resin, active alumina, impregnated carbon, molecular sieve, silica gel, and silica; or may be combined, coated, or impregnated with materials including one of potassium permanganate, potassium carbonate, sodium carbonate, calcium carbonate, calcium sulfate, citric acid, phosphoric acid, and mixtures thereof.

The soundproofing member may include at least one of porous material, fibrous material, and elastic porous material. It also may include a plurality of soundproofing member elements having a plate shape, which are composed of different materials and which overlap each other.

The air pump may include a pumping portion including the inlet tube and the outlet tube, and a motoring portion providing pumping force to the pumping portion by a rotating force of a propeller. In one embodiment, the inlet tube includes a bending portion for suppressing noises.

The housing may include a first opening portion and a second opening portion, and may also include a first metal housing body and a second metal housing body arranged such that the housing has a dual-wall structure. The first metal housing body may form an inner wall of the dual-wall structure and includes foamed aluminum, and a space may be between the first metal housing body and the second metal housing body, the space being implemented as a vacuum portion. The housing may also include a first cover having the inlet hole and coupled with the first opening portion, and a second cover having the outlet hole and coupled with the second opening portion, and the first cover and the second cover may be composed of any one of metal, plastic, thermoplastic polymer material, and thermosetting polymer material.

A first supporting member and a second supporting member may be inserted and installed into the housing, the first supporting member having a first hole into which the inlet tube of the pump is inserted and the second supporting member has a second hole into which the outlet tube of the air pump is inserted and supported. The first supporting member and the second supporting member may be implemented as urethane foam.

In one embodiment, the air pump supplies the fluid to at least one electricity generator including a polymer electrolyte membrane and an anode electrode and a cathode electrode bonded to both sides of the polymer electrolyte membrane, the at least one electricity generator generating electric energy by an electrochemical reaction of fuel including hydrogen with an oxidizing agent.

On embodiment of a fuel cell system, includes at least one electricity generator generating electric energy by an electric-chemical reaction of hydrogen with oxygen; a fuel supplier supplying fuel including hydrogen to the at least one electricity generator; and an air supply system supplying oxidizing agent to the at least one electricity generator. One embodiment of the air supply system includes: a housing having an inlet hole and an outlet hole for respectively allowing inward and outward flow of the oxidizing agent; an air pump inserted and installed into the housing and having an inlet tube into which the oxidizing agent flows and an outlet tube through which the oxidizing agent flows out; a filtering portion installed between the inlet hole and the outlet hole within the housing and filtering particulate contaminants and chemical contaminants in the oxidizing agent; and a soundproofing member installed between the outlet tube and the outlet hole within the housing.

BRIEF DESCRIPTION OF THE DRAWINGS

These and/or other aspects and features of the invention will become apparent and more readily appreciated from the following description of examples of embodiments, taken in conjunction with the accompanying drawings of which.

DETAILED DESCRIPTION

Hereinafter, various examples of embodiments of the present invention, wherein a person having ordinary skill in the art can easily carry out the present invention, will be described in a more detailed manner with reference to the accompanying drawings.

Figure 1:
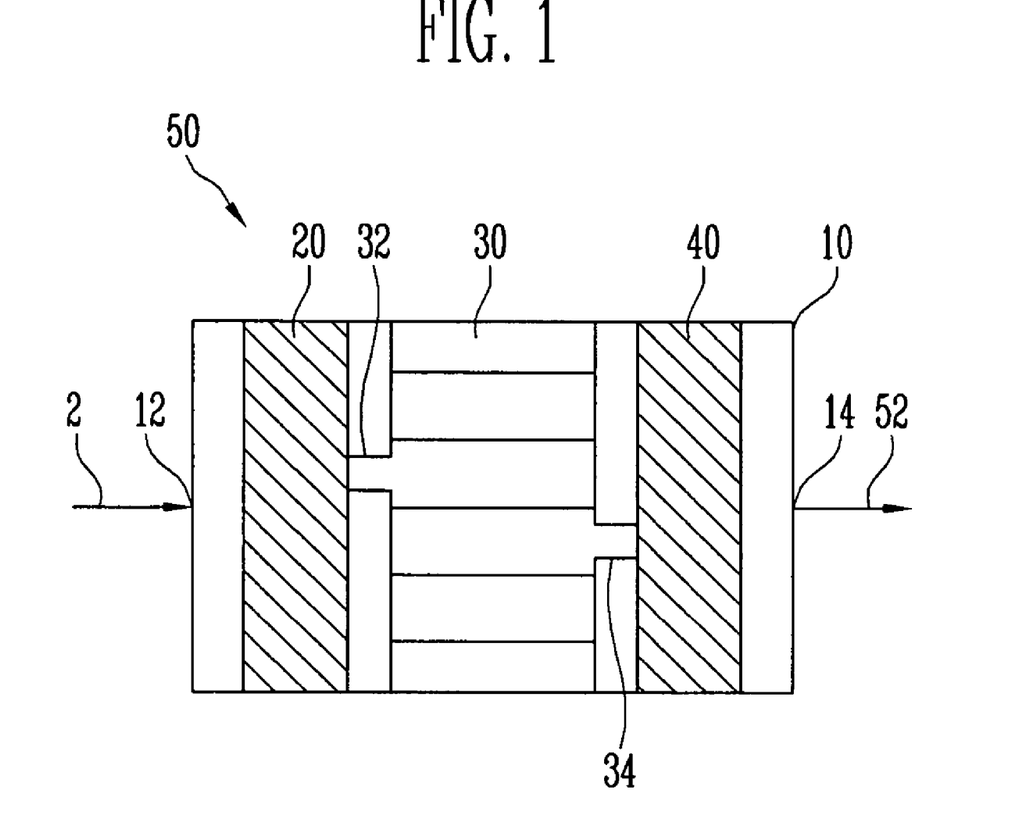
FIG. 1 is a schematic view showing an air supply system according to one embodiment of the present invention.

FIG. 1 is a schematic view showing an air supply system according to one embodiment of the present invention.

Referring to FIG. 1, this embodiment of the present invention provides a miniaturized air supply system 50 suppressing noises of an air pump 30, while removing contaminants from a fluid, such as dirty air 2, flowing into a housing 10 and emitting a clean fluid, such as clean air 52, in which the contaminants are removed. The dirty air 2 is air input into the air supply system 50. For this, the air supply system 50 according to the present embodiment includes a housing 10, and a filtering portion 20, an air pump 30 and a soundproofing member 40, which are inserted and installed into the housing 10.

More specifically, the housing 10 can be made of any material and includes an inlet hole 12 and an outlet hole 14 for allowing air to flow in and out. Materials suitable for the housing 10 are, for example, metal, plastic and polymer material, etc. In the present embodiment, the housing 10 is made of a metal material. The metal material is a high-density member having higher density than other materials, such as rubber or plastic. Therefore, by using the housing 10 made of a metal material, the noises generated inside the housing 10 can be efficiently suppressed from being transferred to the exterior. After manufacturing the housing 10, the housing 10 can be washed or cleaned in order to remove the contaminants capable of adversely affecting the fuel cell, for example, silicone fumes.

The filtering portion 20 filters small particles or unwanted chemical substances in the dirty air 2 flowing in through the inlet hole 12 of the housing 10, and supplies the filtered air to the air pump 20. The small particles include physical contaminants, such as dust, dirt, diesel dust, metal swarf, etc. The unwanted chemical substances include chemical contaminants capable of adversely affecting the fuel cell, such as acid or basic contaminants. Acid contaminants may include, for example, sulfur oxide, carbon oxide, hydrogen sulfur, hydrogen chloride, volatile organic acid, and non-volatile organic acid, etc. Basic contaminants may include, for example, ammonia, amine, amide, sodium hydroxide, lithium hydroxide, potassium hydroxide, a volatile organic salt, and a non-volatile organic salt.

The air pump 30 intakes air the air filtered by the filtering portion 20 through an inlet tube and exhales the air through an outlet tube at a predetermined pressure. In the present embodiment, the air pump 30 includes a small-sized high output vacuum pump and has excellent low noise characteristics.

The soundproofing member 40 receives the air output through the outlet tube 34 of the air pump 30 and transfers it to the side of the outlet hole 14 of the housing 10. The soundproofing member 40 is made of any materials capable of reducing sound energy generated from the air pump 30. For example, the soundproofing member 40 is provided with porous material, fibrous material, and elastic porous material, etc., which can overlapped and be easily installed together in the shape inserted and installed to be fitted to the inside of the housing 10, for example, in a thin circle plate shape.

Hereinafter, several embodiments of the air supply system manufactured according to the technical idea of an embodiment of the present invention will be described.

Figure 2:
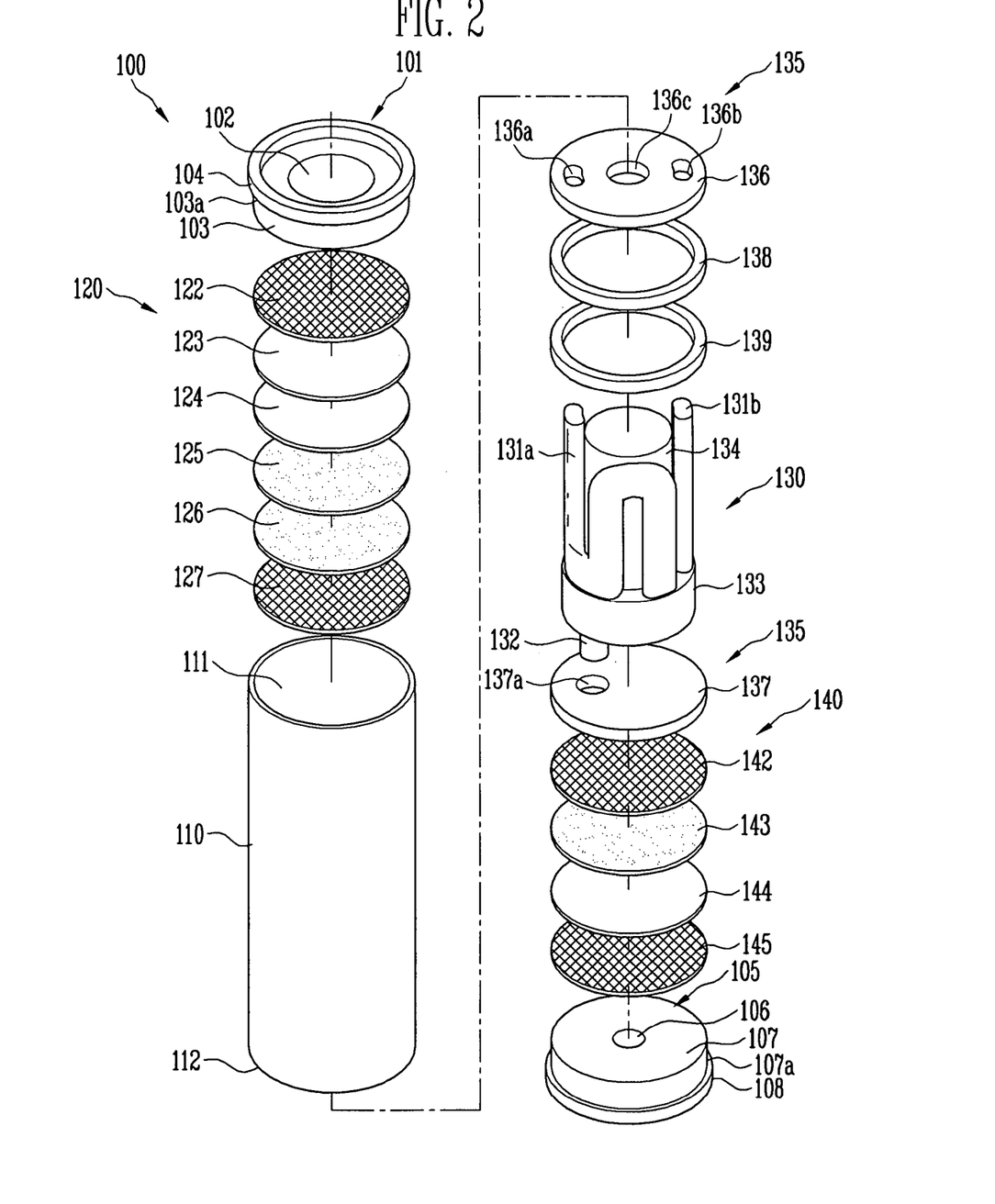
FIG. 2 is an exploded perspective view showing an air supply system according to another embodiment of the present invention.

FIG. 2 is an exploded perspective view showing an air supply system according to a first embodiment of the present invention.

Referring to FIG. 2, the air supply system 100 includes the cylindrical housing body 110, and a filtering portion 120, an air pump 130, a supporting member 135, and a soundproofing member inserted and installed into the housing body 110; and the first and the second covers 101,105 covering both opening portions 111,112 of the housing body 110.

More specifically, the metal housing body 110 is made of any metal material. On the top and the bottom of the metal housing body 100 are provided the first opening portion 111 and the second opening portion 112. For example, the metal housing body 110 is manufactured in a hollow cylindrical shape having a length of about 1400 mm, an outer diameter of about 500 mm, and a thickness of about 1.25 mm by using an aluminum plate or an aluminum zinc alloy plate. If the metal housing body 110 is formed in a cylindrical shape, the substantially cylindrical air pump 130 can be easily inserted and installed into the metal housing body 110, and the entire volume of the air supply system 100 can be minimized. Of course, the metal housing body 100 can be changed into other shape, for example, a box shape.

The first cover 101 is inserted and installed into the first opening portion 111 of the metal housing body 110. For this, the first cover 110 has a cylindrical body 103 inserted into the first opening portion 111 and a head portion 104 having a larger diameter than the body 103 on which a stepped portion 103a is mounted. The first cover 101 is provided with the inlet hole 102 into which the dirty air in the atmosphere flows. The inlet hole 102 is extended to the opposite side from one side of the first cover 101 passing through the inner part thereof.

The second cover 105 is inserted and coupled into the second opening portion 112 of the metal housing body 110. For this, the second cover 105 has a cylindrical body 107 inserted into the second opening portion 112 and a head portion 108 having a larger diameter than the body 107 on which a stepped portion 107a is mounted. The second cover 105 is provided with the outlet hole 106 through which the clean air filtered by the filtering portion 120 flows out. The outlet hole 106 is extended to the opposite side from one side of the second cover 105 passing through the inner part thereof.

The filtering portion 120 is inserted and installed into the metal housing body 110. At this time, the filtering portion 120 is inserted and installed between the first cover 101 and the inlet tubes 131a, 131b of the air pump 130. The filtering portion 120 filters the dirty air taken in through the inlet hole 102 of the first cover 101, and outputs the filtered air toward the inlet tubes 131a, 131b of the air pump 130. For this, the filtering portion 120 includes first and second particulate removing filters 123,124, first and second absorbing filters 125,126 and two sub-filters 122,127.

The first and the second particulate removing filters 123, 124 are made of a net including a fiber material or a cellulose material. In this embodiment, the first and the second particulate removing filters are formed in a circle plate shape of different materials, and is inserted and installed into a stacked structure in the width direction of the housing 110. The first and the second particulate removing filters 123, 124 can be made of cellulose or a synthetic member, which are electrostatically treated or have a nanofiber layer, in order to improve the efficiency of particulate removal. According to the construction described above, the first and the second particulate removing filters remove, for example, polymer hydrocarbon generated from limestone harmful to the fuel cell or tar from a road.

The first and the second absorbing filters 125,126 are formed in a circle plate shape of an absorbing material and are installed on one side of the first and the second particulate removing filters 123, 124, thereby removing the chemical contaminants in the air flowing out by passing through the particulate removing filters 123,124. Absorbing materials may include, for example, active carbon fiber, ion exchange fiber, ion exchange resin, active alumina, alumina, impregnated carbon, molecular sieve, silica gel, or silica, etc. In order to improve the absorbing effect of the filters, the absorbing material can be combined, coated or impregnated with materials including any one of potassium permanganate, potassium carbonate, sodium carbonate, calcium carbonate, calcium sulfate, citric acid, phosphoric acid, or mixtures thereof.

The first and the second absorbing filters 125,126 each can be treated to have an acid surface and a basic surface. In this case, the first and the second absorbing filters 125,126 can more efficiently absorb basic contaminants and acid contaminants. Acid contaminants may include, for example, sulfur oxide, nitrogen oxide, hydrogen sulfide, hydrogen chloride, volatile organic acid and non-volatile organic acid, etc. Basic contaminants may include, for example, ammonia, amine, amide, sodium hydroxide, lithium hydroxide, potassium hydroxide, a volatile organic base, or a non-volatile organic base, etc.

The sub-filters 122,127 are positioned on both sides of the first and the second particulate removing filters 123,124 and the first and the second absorbing filters 125,126 in order to support them. The sub-filters 122,127 are formed in a circle plate shape of a screen or mesh shape, and one sub-filter 122 installed on the side of the first cover 101 cuts off the flow of contaminants that are larger than particulates into the inside of the housing.

The air pump 130 intakes the clean air filtered to a predetermined level by the filter 120 and outputs it under a predetermined pressure. The air pump 130 includes a pumping portion 133 and a motor portion 134. The pumping portion 133 includes two inlet tubes 131a, 131b into which the clean air flows from the filtering portion 120, and an outlet tube 132 through which the air flows out. The motor portion 134 can be implemented, for example, as an electric motor applying pumping force to a propeller inserted and installed into the pumping portion 133 by electric energy. The pumping portion 133 and the motor portion 134 are one example of an air pump for compressing air inside of the housing. The air supply system of the present invention, however, can also be easily implemented by using the air pump employing the application structure of a reciprocating mechanical device other than the application structure of a rotating mechanical device using the electrical motor and the propeller, for example, a reciprocating movement of a piston.

In order to reduce noises generated from the air pump 130, the inlet tubes 131a, 131b of the air pump 130 are formed to have a bending portion. The bending portion includes a substantially N-letter shape or other zigzag or serpentine shape. The outlet tube 132 of the air pump 130 can be implemented to have a bending portion similar to that of the inlet tubes 131a, 131b, in order to reduce noises.

The supporting member 135 supports the air pump 130 in the metal housing body 110 so that the air pump 130 can be stably inserted and installed. The supporting member 135 is formed of a predetermined soundproofing member composed of materials such as urethane foam, etc, capable of suppressing noises generated in the air pump 130, and is divided into several pieces of the supporting members 136,137,138,139 to properly surround the air pump 130. The first supporting member 136 is installed between the filtering portion 120 and the air pump 130. The first supporting member 136 includes a first hole 136a and a second hole 136b into which two inlet tubes 131a, 131b of the air pump 130 are inserted, and a third hole 136c for properly discharging the heat generated from the motor portion 134 of the air pump 130. The second supporting member 137 is inserted between the air pump 130 and the soundproofing member 140. The second supporting member 137 includes a fourth hole to support the outlet tube 132 of the air pump 130. The two sub-supporting members 138,139 are inserted and installed between the inner circumference surface of the metal housing body 110 and the side face of the air pump 130. The two sub-supporting members 138,139 are in a ring shape having a predetermined thickness and width in order to be easily fitted to the outer circumference surface of the air pump 130.

The soundproofing member 140 reduces operating noise of the air pump 130 inserted and installed into the metal housing body 110 or frictional noise by the flow of air. The soundproofing member 140 is inserted and installed between the air pump 130 and the second cover 105, and the both sides thereof are installed to come in contact with the outlet tube 132 of the air pump 130 and the outlet hole 106 of the second cover 105. The soundproofing member 140 is formed of a proper material and thickness in order not to greatly disturb the flow of air flowing out from the air pump 130. The materials of the soundproofing member 140 include a porous material, fibrous material, and elastic porous material. The soundproofing member 140 includes a plurality of soundproofing member elements 142,143,144,145 in a plate shape composed of different materials and overlapped and installed with each other, in order to improve the function of suppressing noises. In this case, the first soundproofing member 143 includes an elastic porous material, the second soundproofing member 144 includes a fibrous material, and two sub-soundproofing members 142,145 can be formed in a mesh shape on both sides of the first and the second soundproofing members 143,144 in order to support them.

Figure 3:
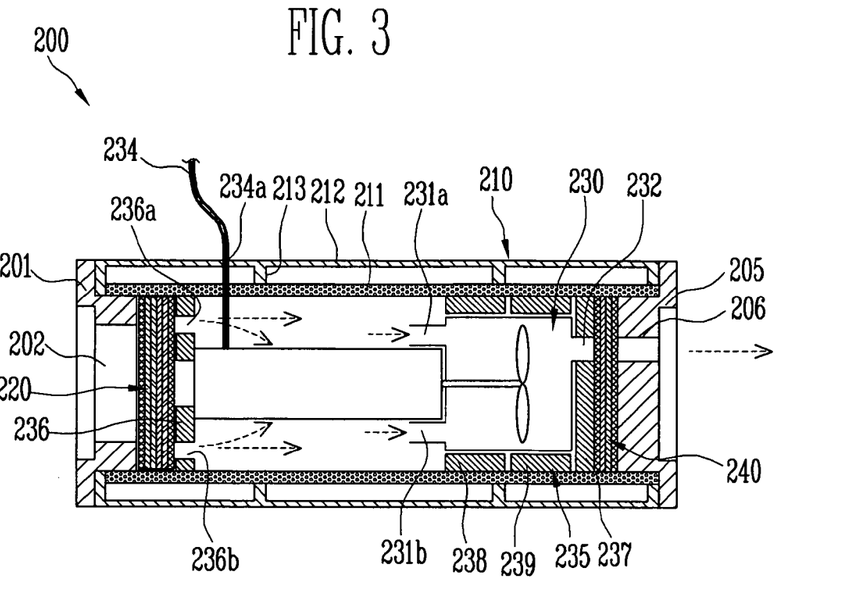
FIG. 3 is a cross sectional view showing an air supply system according to a second embodiment of the present invention.

FIG. 3 is a cross sectional view showing the air supply system according to another embodiment of the present invention.

Referring to FIG. 3, the air supply system 200 according to this embodiment of the present invention includes a dual metal housing body 210, first and second covers 201, 205, a filtering portion 220, an air pump 230, a supporting member 235 and a soundproofing member 240. The dual metal housing body 210 and the first and second covers 201, 205 form a housing of the air supply system 200. The air supply system 200 according to this embodiment has a construction similar to that of the air supply system 100 according to the embodiment described above, excepting that the housing body includes a dual metal. Hereinafter, the detailed description of the common components of the air supply system described previously will be omitted.

More specifically, the dual metal housing 210 includes a first metal housing body 211 and a second metal housing body 212 as structures capable of suppressing noises.

The first metal housing body 211 includes a porous metal member and is formed in a cylindrical shape. In this case, the first metal housing body 211 includes an aggregate of independent bubbles and is formed in a structure that each bubble is communicated with other bubbles via a fine crack formed on a diaphragm defining each bubble. Such a structure allows the friction of sound waves with the wavefront of the diaphragm so that it converts sound energy into thermal energy, thereby indicating an excellent sound-absorbing effect. In proper foam metals used for the first metal housing body 211, for example, foam aluminum, which is excellent in ultra lightweight, non-combustibility, sound absorbing characteristics, high strength, moisture resistance, may be included.

The second metal housing body 212 is composed of metal and is formed in a cylindrical shape. The second metal housing body 212 is installed to surround the exterior of the first metal housing body 211. At this time, the first and the second metal housing bodies 211,212 are separated from each other by a predetermined space by the diaphragm 213. The diaphragm 213 can be formed as a projection, a stripe or a mesh shape. Such a space formation allows the sound-absorbing function of the first metal housing body 211 to be improved, thereby, accomplishing more effective noise suppression.

According to the construction described above, in the air supply system 200 into which the filtering portion 220 and the air pump 230 for filtering dirty air are inserted and installed, the operating noise of the air pump 230 and the noise generated from the air flow passing through the filtering portion 220 and the air pump 230 can be more efficiently reduced and suppressed.

The assembling process of the air supply system 200 described above will be briefly described below.

First, a first porous metal housing body 211 with a cylindrical shape having a first diameter is inserted into a second metal housing body 212 with a cylindrical shape having a second diameter slightly greater than the first diameter. The first metal housing body 211 is inserted and fixed into an opening portion in one side of the second metal housing body 212, and supported by the edge of an opening portion in an other side of the second metal housing body 212. The diameter of the opening portion in the other side of the second metal housing body 212 is slightly smaller than that of the opening portion in the one side thereof. In this process, a predetermined adhesive, for example, an adhesive for aluminum structure, is applied in a small amount on the diaphragm 213 of the second metal housing body 212 so that the first metal housing body 211 and the second metal housing body 212 can be fixedly bonded.

Next, a lower outer circumference surface of the air pump 230 is surrounded by sub-supporting members 238, 239. The air pump 230 surrounded by sub-supporting members 238, 239 is fitted to the first metal housing body 211. A power line 234 connected to the air pump 230 is pulled outward through a hole 234a formed by penetrating the first and the second metal housing bodies 211, 212 from the inside thereof.

Next, the first supporting member 236 is installed on the sides of the inlet tubes 231a, 231b of the air pump 230. At this time, unlike the case of the first embodiment, the inlet tubes 231a, 231b are not inserted into the first and the second holes 236a, 236b of the first supporting member 236. The second supporting member 237 is inserted on the side of the outlet tube 232 of the air pump 230. At this time, the outlet tube 232 is inserted and supported into the hole of the second supporting member 237.

Next, the filtering portion 220 is inserted into the first opening portion on the side of the inlet hole 202 of the housing 210. The first opening portion is tightly closed with a first cover 201.

Next, the soundproofing member 240 is inserted into the second opening portion on the side of the outlet hole 206 of the housing 210. The second opening portion is tightly closed with a second cover 205. Thereby, the air supply system on which the air pump is mounted, including an air filtering function and a noise suppressing function, is simply assembled and completed.

Figure 4:
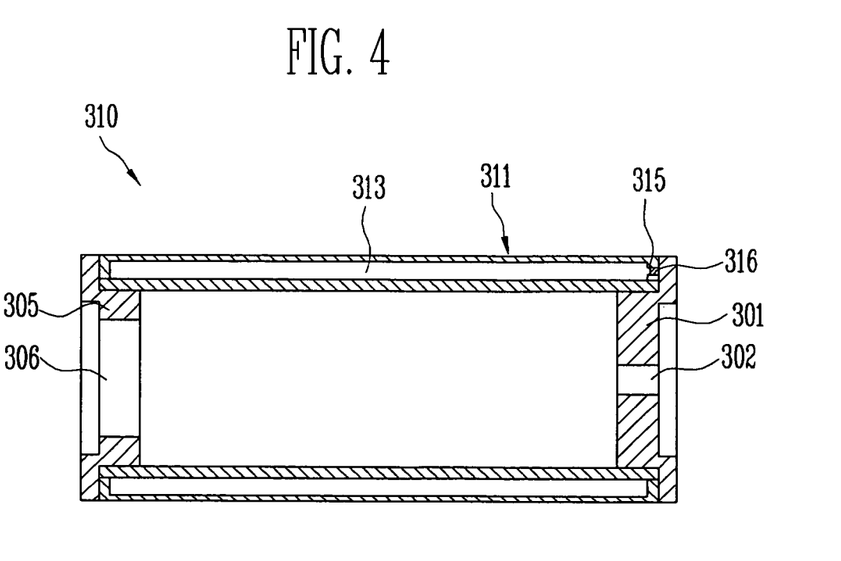
FIG. 4 is a cross sectional view showing another embodiment of a housing, which can be applied to the air supply system according to the embodiment of the present invention shown in FIG. 3.

FIG. 4 is a cross sectional view showing another example of the housing, which can be applied to the air supply system according to the second embodiment of the present invention.

Referring to FIG. 4, a housing 310 according to the present embodiment has a vacuum housing structure wherein noise generated from inside the housing is more efficiently reduced. In a vacuum state, there is little medium transferring sound according to the degree of vacuum, resulting in sound not being transferred well. Like this, the present embodiment basically employs the principle that sound is not properly transferred in a vacuum state.

More specifically, the housing 310 includes a vacuum housing body 311, a first cover 301 and a second cover 305. The vacuum housing body 311 is formed in a substantially hollow cylindrical shape of metal, for example, aluminum or aluminum zinc alloy excellent in being lightweight, non-combustible, high strength, soundproof and moisture resistant. The vacuum housing body 311 is provided with a vacuum portion 313 formed between at least two folds of metal members. Also, the vacuum housing body 311 is provided with an exhaust hole 315 for forming the vacuum portion 313. A predetermined sealing material 316 seals the exhaust hole 315 after the exhausting process for the vacuum portion of the vacuum housing body 311.

The first cover 301 is inserted and coupled into an opening portion in one side of the vacuum housing body 311. The first cover 301 is provided with an inlet hole 302 for allowing inward flow of dirty air in the atmosphere. Referring to FIGS. 2 and 4, the second cover 305 is inserted and coupled into the second opening portion 112 of the metal housing body 110. The second cover 305 is provided with the outlet hole 306 for allowing outward flow of clean air filtered by the filter portion.

According to the construction described above, by using the housing with a noise cutoff function by the vacuum portion, the low noise air supply system can be provided.

Figure 5:
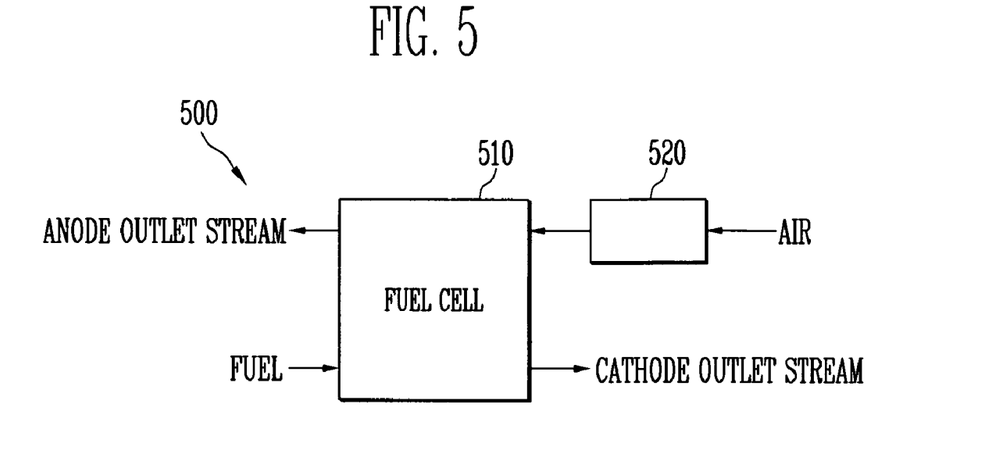
FIG. 5 is a schematic block diagram showing a fuel cell system in which an air supply system is used according to one embodiment of the present invention.

FIG. 5 is a block view showing a fuel cell system using an air supply system according to an embodiment of the present invention.

Referring to FIG. 5, a fuel cell system 500 includes a fuel cell 510 and a low noise air supply system. 520 supplying clean air to the fuel cell 510. The air supply system 520 may correspond to several embodiments of the present invention.

The fuel cell 510 includes at least one unit fuel cell (not shown) generating electric energy by using fuel and air. The unit fuel cell means an electricity generator generating a predetermined voltage and current by an electrochemical reaction of hydrogen with oxygen. The fuel cell 510 generates electric energy and exhausts water and carbon dioxide obtained as a reaction product. At this time, non-reacted fuel and air that do not react in the fuel cell 510 are exhausted outside of the fuel cell 510, along with carbon dioxide and water. The non-reacted fuel can be supplied again to the fuel cell 510 through a circulation path for recycling.

The fuel cell 510 can include a stack structure, such that a plurality of unit cells are stacked. The fuel cell stack is commonly compressed and sealed. In this case, in order to supply a necessary amount of air and clean air to each unit fuel cell in the fuel cell stack, the air supply system 520 is used.

The air supply system 520 provides sufficient air including oxygen in more than the necessary amount to the fuel cell stack having the compressed and sealed structure, for a longer continuant operation of the fuel cell 510. At this moment, the air supply system 520 removes contaminants having adverse effects on the fuel cell 510, for example, particulate or unwanted chemical substance, thereby providing clean air. Also, the air supply system 520 having a noise suppressing structure suppresses and reduces noise generated from the air pump inserted and installed therein and the flow of air.

According to the construction as above, adverse effects by dirty air in the atmosphere are substantially cut off, and the operating life time of the fuel cell can therefore be guaranteed. Also, the noise generated from the air pump and the flow of air is suppressed, and the low noise fuel cell system can therefore be provided.

Figure 6:
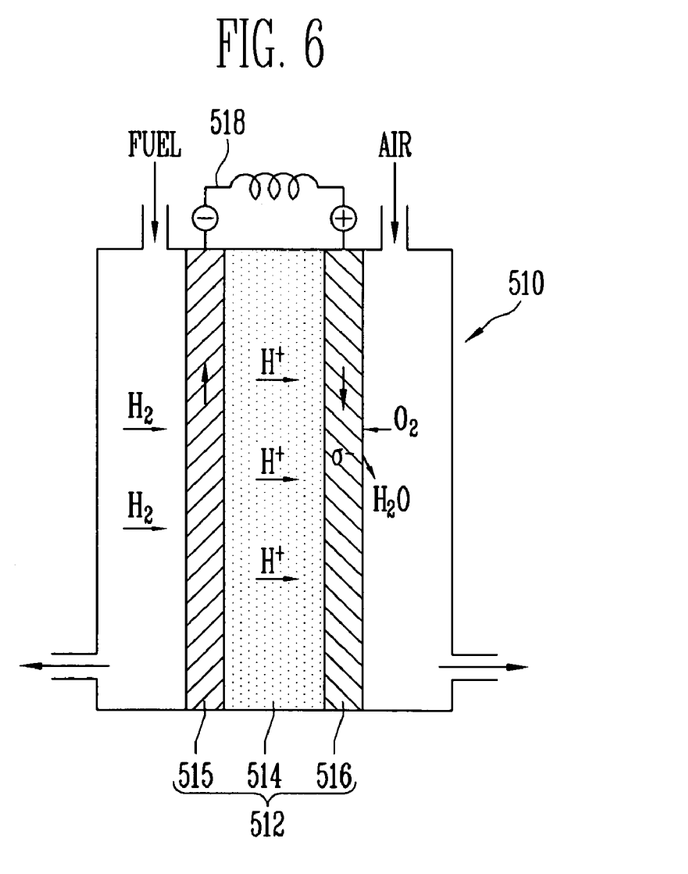
FIG. 6 is a schematic cross sectional view of an electricity generator of the embodiment of a fuel cell system shown in FIG. 5.

FIG. 6 is a schematic cross-sectional view with respect to an electricity generator of the fuel cell shown in FIG. 5.

Referring to FIG. 6, the fuel cell 510 includes at least one electricity generator. The electricity generator includes a membrane-electrode assembly (MEA) 512 generating electric energy through an oxidation and reduction reaction of hydrogen with oxygen, and a separator (not shown) adhered closely to both sides of the membrane-electrode assembly 512 and transferring fuel including hydrogen and oxidizing agent, for example, oxygen or air, to the membrane-electrode assembly 512. The membrane-electrode assembly 512 includes a polymer electrolyte membrane 514, as well as an anode electrode 515 and a cathode electrode 516 bonded on both sides thereof. The separator can be omitted, depending on the structure of the fuel cell 510.

If fuel including hydrogen gas or hydrogen is supplied to the anode electrode 515 in the fuel cell 510, the fuel causes an electro-chemical oxidation reaction in the anode electrode 515, thereby being ionized and oxidized as a hydrogen ion $H^+$ and an electron $e^-$. The ionized hydrogen ion is moved from the anode electrode 515 to the cathode electrode 516 through the polymer electrolyte membrane 514, and the electron is moved from the anode electrode 515 to the cathode electrode 516 through an external electric wire 518. The hydrogen ion moved to the cathode electrode 516 causes an electrochemical reduction reaction with oxygen supplied to the cathode electrode 516, generating reaction heat and water. Electric energy is generated by a movement of the electron.

The fuel cell described above can be applied to a polymer electrolyte fuel cell and a direct methanol fuel cell. The electrochemical reaction of the polymer electrolyte fuel cell and the direct methanol fuel cell will be described using the following reaction equation 1 and reaction equation 2:

Anode electrode: $H_2 \rightarrow 2H^+ + 2e^-$

Cathode electrode: $\frac{1}{2}O_2 + 2H^+ + 2e^- \rightarrow H_2O$ [Reaction equation 1]

Anode electrode: $CH_3OH + H_2O \rightarrow CO_2 + 6H^+ + 6e^-$

Cathode electrode: $\frac{3}{2}O_2 + 6H^+ + 6e^- \rightarrow 3H_2O$ [Reaction equation 2]

According to the present invention, the contaminants in the atmosphere, capable of having adverse affects on the operating lifetime of the fuel cell, are absorbed, thereby supplying clean air to the fuel cell. Also, by using several metal housings with a noise suppressing structure and the soundproofing member installed on the side of the outlet tube of the air pump, the noise generated from the air pump supplying a required amount of clean air to the fuel cell and from the flow of air can be reduced and suppressed.

Also, by using a structure in which the air pump is inserted and installed into the inside of a single housing together with the air filtering function and the noise suppressing function, a small-sized air supply system suitable for a transportable fuel cell system can be provided. Furthermore, the present invention can contribute to the implementation of a small-sized fuel cell system with low noise, while preventing a shortening of the lifetime of the fuel cell due to contaminants in the atmosphere.

Although a few embodiments of the present invention have been shown and described, it would be appreciated by those skilled in the art that changes might be made in these embodiments without departing from the principles and spirit of the invention, the scope of which is defined in the claims and their equivalents.

What is claimed is:

1. A fuel cell air supply system comprising:
    a housing comprising a body, a first cover covering a first end of the body and having an inlet hole, and a second cover covering a second end of the body and having an outlet hole;
    an air pump in the housing and having an inlet tube into which a fluid can enter the air pump and an outlet tube through which the fluid can exit the air pump;
    a filtering portion located between the outlet tube and the second cover; and
    a soundproofing member located between the outlet tube and the second cover and contacting an inner area and substantially an entire inner periphery of the outlet tube such that the fluid from the inlet hole passes through the soundproofing member before exiting the housing.

2. The system according to claim 1, wherein the filtering portion comprises at least one particulate removing filter and at least one absorbing filter that are compressed and have a plate shape.

3. The system according to claim 2, wherein the particulate removing filter comprises cellulose, a synthesis member having a nanofiber layer, or a combination thereof.

4. The system according to claim 2, wherein the absorbing filter has a basic surface for removing acid contaminants comprising at least one of sulfur oxide, nitrogen oxide, hydrogen sulfide, hydrogen chloride, volatile organic acids, and nonvolatile organic acids.

5. The system according to claim 2, wherein the absorbing filter has an acid surface for removing basic contaminants comprising at least one of ammonia, amine, amide, sodium hydroxide, lithium hydroxide, potassium hydroxide, volatile organic base, and non-volatile organic base.

6. The system according to claim 2, wherein the absorbing filter comprises at least one of active carbon fiber, ion exchange fiber, ion exchange resin, active alumina, impregnated carbon, molecular sieve, silica gel, and silica.

7. The system according to claim 6, wherein the absorbing filter is combined, coated, or impregnated with materials comprising one of potassium permanganate, potassium carbonate, sodium carbonate, calcium carbonate, calcium sulfate, citric acid, phosphoric acid, and mixtures thereof.

8. The system according to claim 1, wherein the soundproofing member comprises at least two of a porous material, a fibrous material, and an elastic porous material.

9. The system according to claim 8, wherein the soundproofing member comprises a plurality of soundproofing plates stacked together, each of the soundproofing plates comprising different materials from each other.

10. The system according to claim 1, wherein the air pump comprises a pumping portion including the inlet tube and the outlet tube, and a motoring portion comprising a propeller for providing a pumping force to the pumping portion.

11. The system according to claim 10, wherein the inlet tube comprises a bending portion for suppressing noise.

12. The system according to claim 1, wherein the housing comprises a first metal housing body and a second metal housing body arranged such that the housing has a dual-wall structure.

13. The system according to claim 12, wherein the first metal housing body forms an inner wall of the dual-wall structure and comprises foamed aluminum.

14. The system according to claim 12, wherein a space is between the first metal housing body and the second metal housing body, the space being a vacuum portion.

15. The system according to claim 1, wherein the first cover and the second cover comprise any one of metal, plastic, thermoplastic polymer material, and a thermosetting polymer material.

16. The system according to claim 1, further comprising a first supporting member having a first hole in which the inlet tube of the pump is located and a second supporting member having a second hole in which the outlet tube of the air pump is located.

17. The system according to claim 16, wherein the first supporting member and the second supporting member comprise urethane foam.

18. The system according to claim 1, wherein the air pump supplies the fluid to at least one electricity generator comprising a polymer electrolyte membrane and an anode electrode and a cathode electrode bonded to the polymer electrolyte membrane, the at least one electricity generator generating electric energy by an electrochemical reaction of fuel including hydrogen with an oxidizing agent.

19. A fuel cell reactant supply system, comprising:
    at least one electricity generator for generating electric energy by an electric-chemical reaction of hydrogen with oxygen;
    a fuel supplier supplying fuel including hydrogen to the at least one electricity generator; and
    an air supply system supplying oxidizing agent to the at least one electricity generator, wherein the air supply system comprises:
    a housing having an inlet hole and an outlet hole for respectively allowing inward and outward flow of the oxidizing agent;
    an air pump in the housing and having an inlet tube into which the oxidizing agent can enter the air pump and an outlet tube through which the oxidizing agent can exit the air pump;
    a filtering portion located between the inlet hole and the outlet hole within the housing; and
    a soundproofing member located between the outlet tube and the outlet hole within the housing and contacting an inner area and substantially an entire inner periphery of the outlet tube.

* * * * *

UNITED STATES PATENT AND TRADEMARK OFFICE
CERTIFICATE OF CORRECTION

PATENT NO. : 8,153,287 B2
APPLICATION NO. : 11/440722
DATED : April 10, 2012
INVENTOR(S) : Jun Won Suh et al.

Page 1 of 1

It is certified that error appears in the above-identified patent and that said Letters Patent is hereby corrected as shown below:

In the Claims

Column 11, Claim 1, line 10   Delete "outlet tube"
                              Insert -- first cover --

Column 12, Claim 19, line 36  Insert -- for --
                              After "supplier"

Column 12, Claim 19, line 38  Insert -- for --
                              After "system"

Insert -- an --
                              After "supplying"

Signed and Sealed this
Fifteenth Day of October, 2013

Teresa Stanek Rea
*Deputy Director of the United States Patent and Trademark Office*